US012597873B2

(12) United States Patent
Kamikawabata et al.

(10) Patent No.: US 12,597,873 B2
(45) Date of Patent: Apr. 7, 2026

(54) EXCITATION WAVEFORM DETERMINATION DEVICE, MOTOR DRIVE DEVICE, EXCITATION WAVEFORM DETERMINATION METHOD, MOTOR DRIVE METHOD, AND PROGRAM

(71) Applicant: NIPPON STEEL CORPORATION, Tokyo (JP)

(72) Inventors: Masahito Kamikawabata, Tokyo (JP); Rei Honma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 237 days.

(21) Appl. No.: 18/689,797

(22) PCT Filed: Jun. 22, 2022

(86) PCT No.: PCT/JP2022/024809
§ 371 (c)(1),
(2) Date: Mar. 6, 2024

(87) PCT Pub. No.: WO2023/084830
PCT Pub. Date: May 19, 2023

(65) Prior Publication Data
US 2025/0132711 A1     Apr. 24, 2025

(30) Foreign Application Priority Data
Nov. 15, 2021     (JP) .................................. 2021-185783

(51) Int. Cl.
*H02P 23/04* (2006.01)
*H02P 23/14* (2006.01)
(52) U.S. Cl.
CPC .............. *H02P 23/04* (2013.01); *H02P 23/14* (2013.01)

(58) Field of Classification Search
CPC .. H02P 23/04; H02P 23/14; H02P 6/32; H02P 29/50; H02P 27/04; H02P 2207/05; H02P 2209/13
(Continued)

(56) References Cited

U.S. PATENT DOCUMENTS 6,469,469 B1 * 10/2002 Chambers ............... H02P 23/08
318/807
2006/0038531 A1     2/2006 Wakabayashi et al.

FOREIGN PATENT DOCUMENTS

JP     2007-312520 A     11/2007

OTHER PUBLICATIONS

Honda et al., "Driving an Open-Winding Structure PMSM Using Third Harmonic Current Control", IEEJ Transactions on Industry Applications, vol. 141, No. 1, pp. 39 to 45, Jan. 1, 2021.

* cited by examiner

*Primary Examiner* — David Luo
(74) *Attorney, Agent, or Firm* — Birch, Stewart, Kolasch & Birch, LLP

(57)     ABSTRACT
An excitation waveform determination device (100) sets an initial candidate solution group (IS) and a new candidate solution group (US) as one or a plurality of candidate groups of an excitation waveform based on a harmonic superimposition condition (HC) being information that specifies a harmonic to be superimposed on a fundamental wave included in the excitation waveform, executes an electromagnetic field analysis to calculate respective electromagnetic forces generated in a stator (320) when making the candidate solutions included in the one or plurality of set candidate solution groups of the excitation waveform flow through a motor (M), and determines the excitation waveform based on a result of the execution of the electromagnetic field analysis.

17 Claims, 7 Drawing Sheets

(58) Field of Classification Search
USPC ............................................ 318/400.01, 700
See application file for complete search history.

F I G. 1
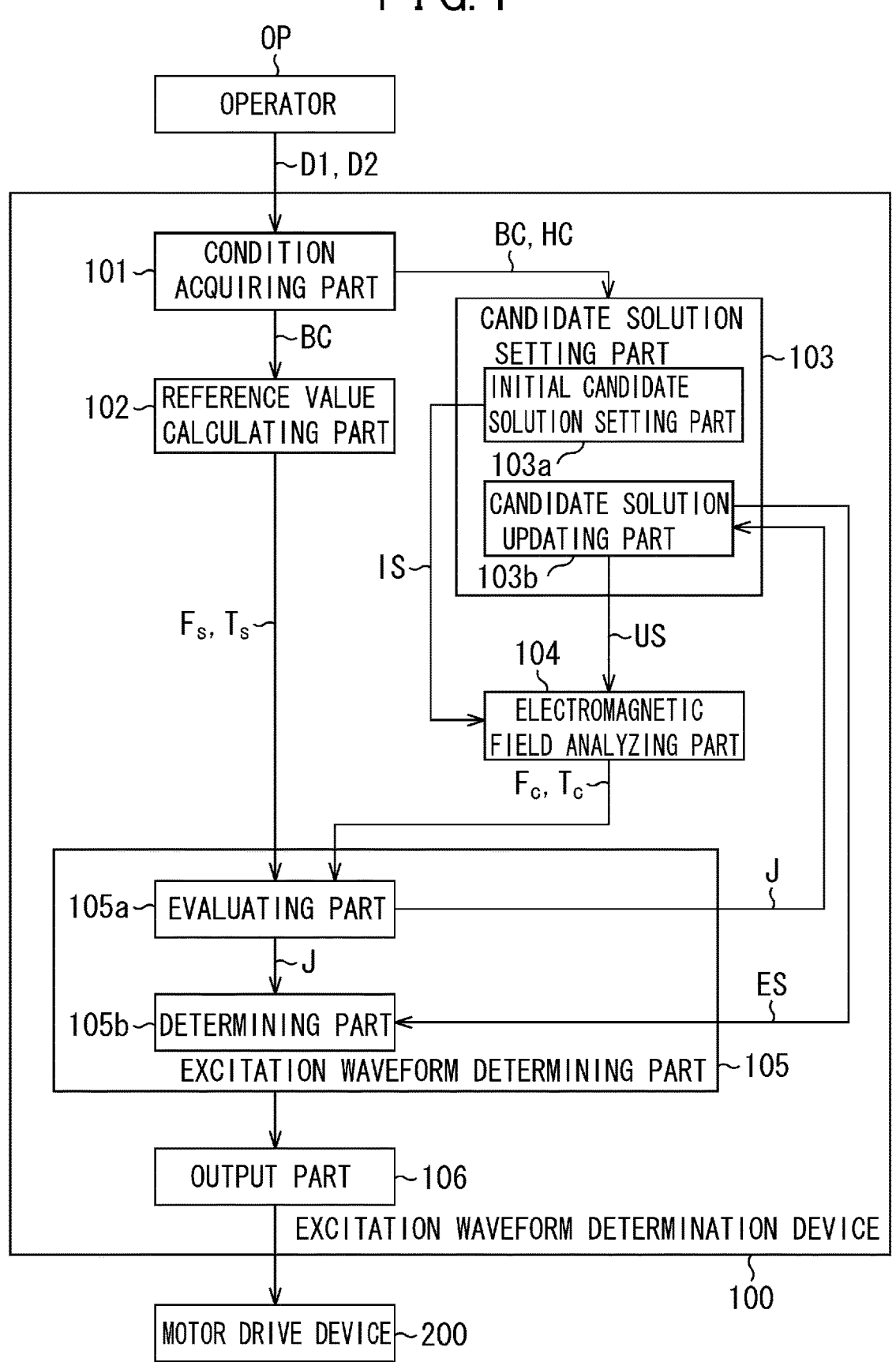

F I G. 2
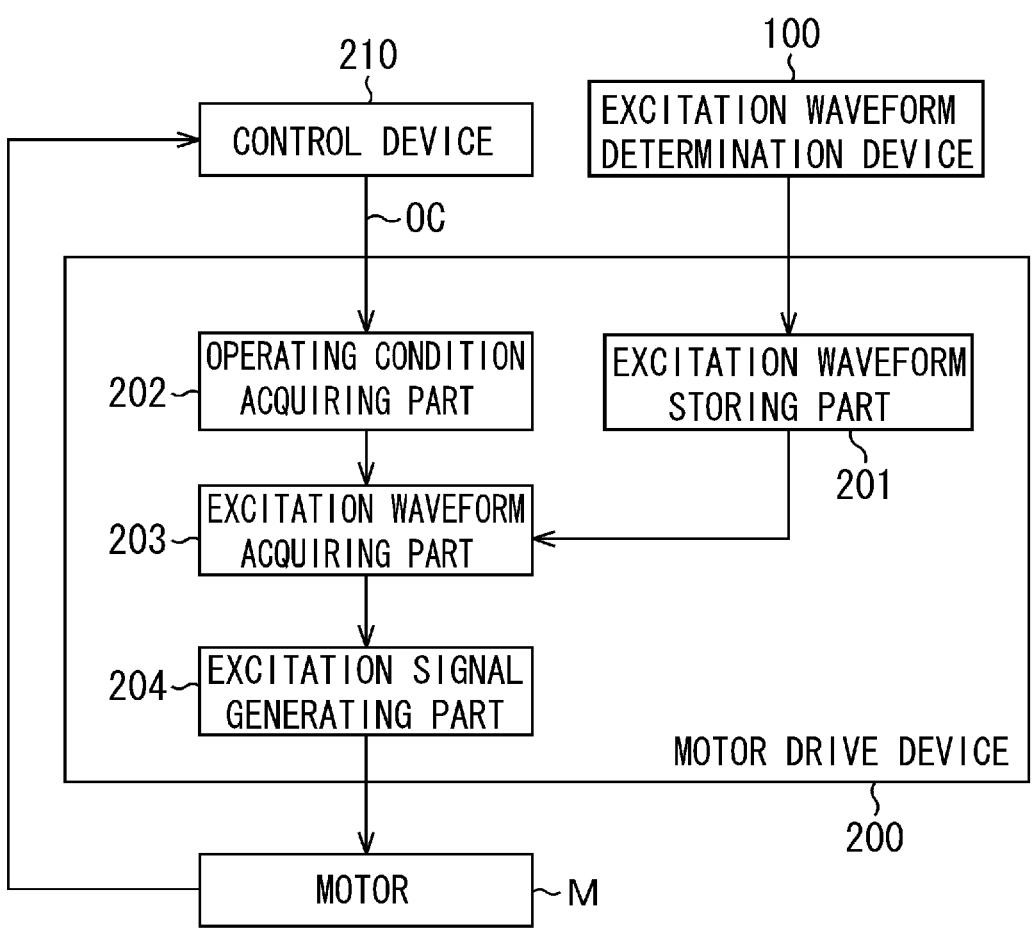

F I G. 3
M
322    311    310
321
320
311i
312d
311b
321a
311e    311a    311f    312a    321b
321c
312c    311c
311h    312b
311d    311g
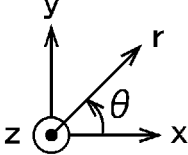

F I G. 4
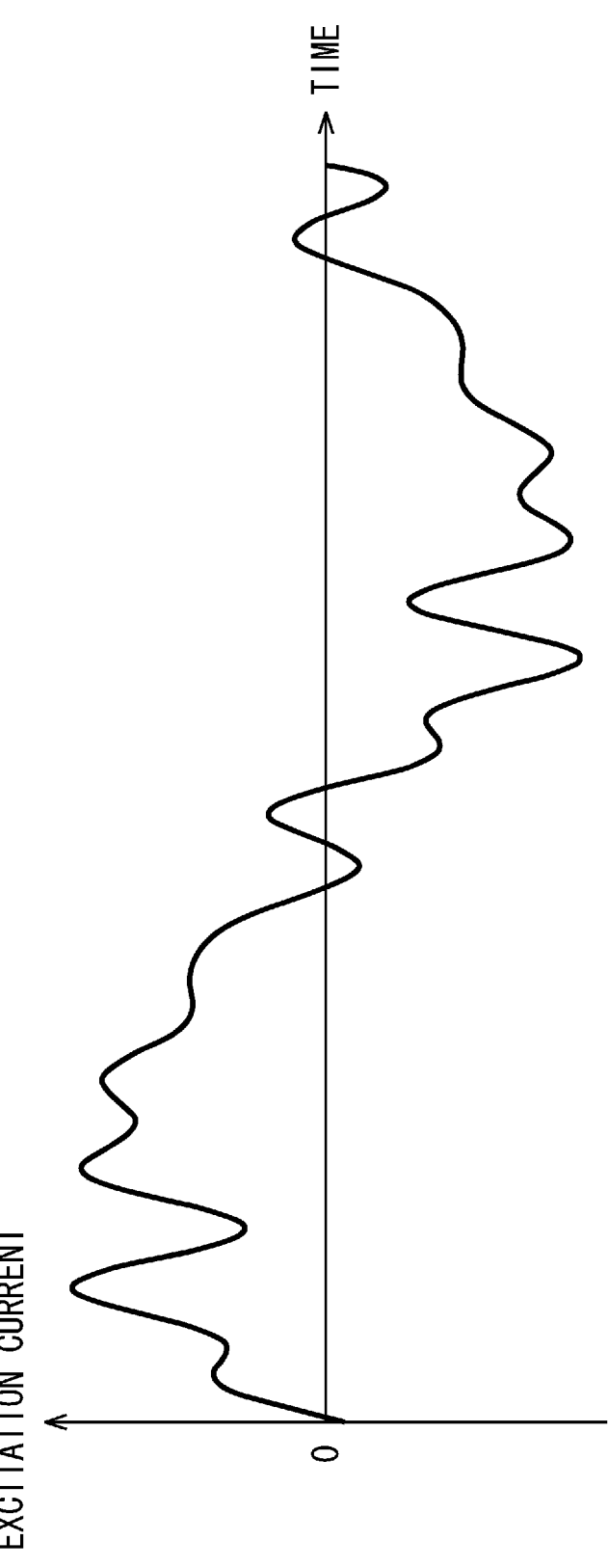

F I G. 6
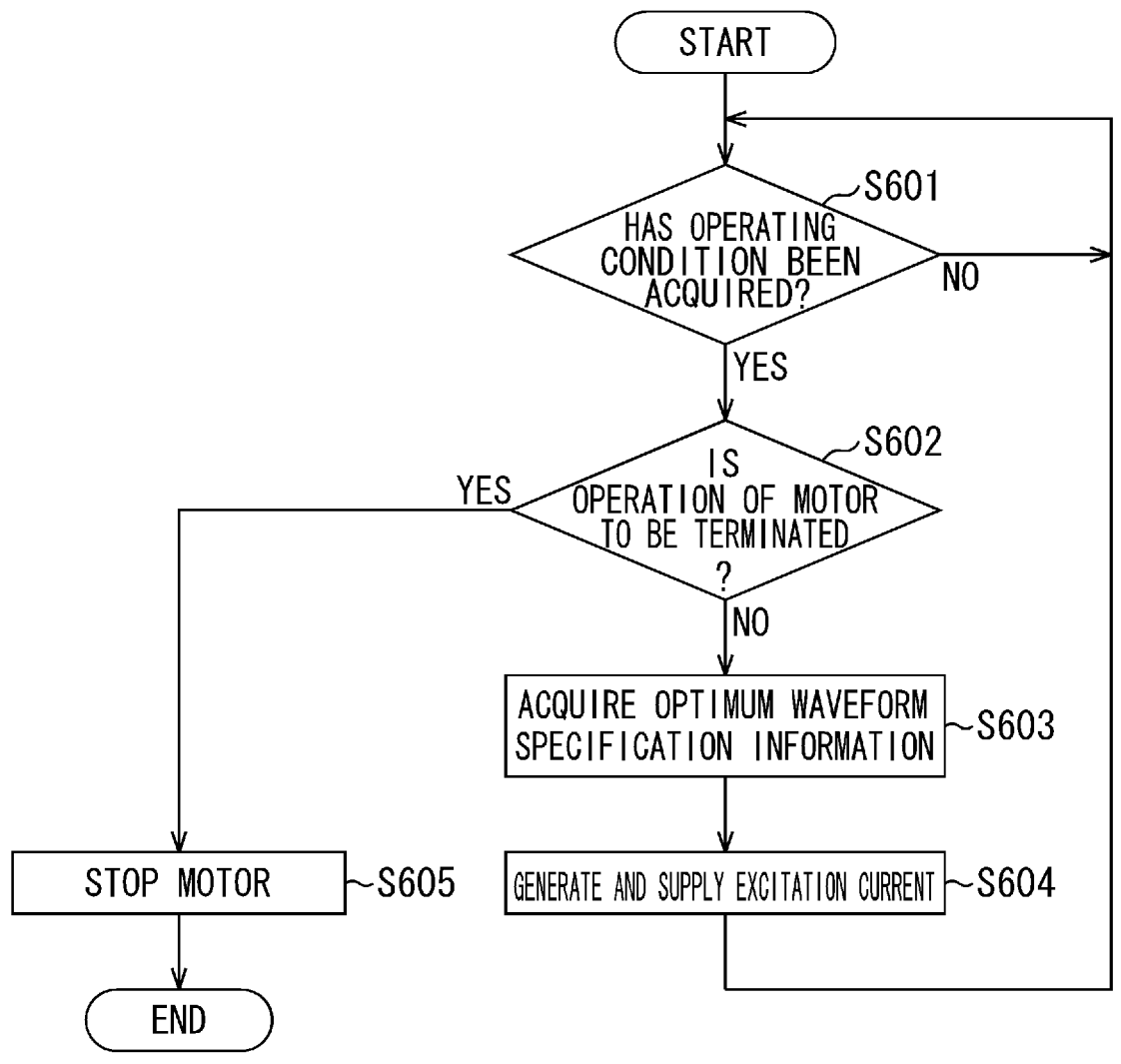

F I G. 7
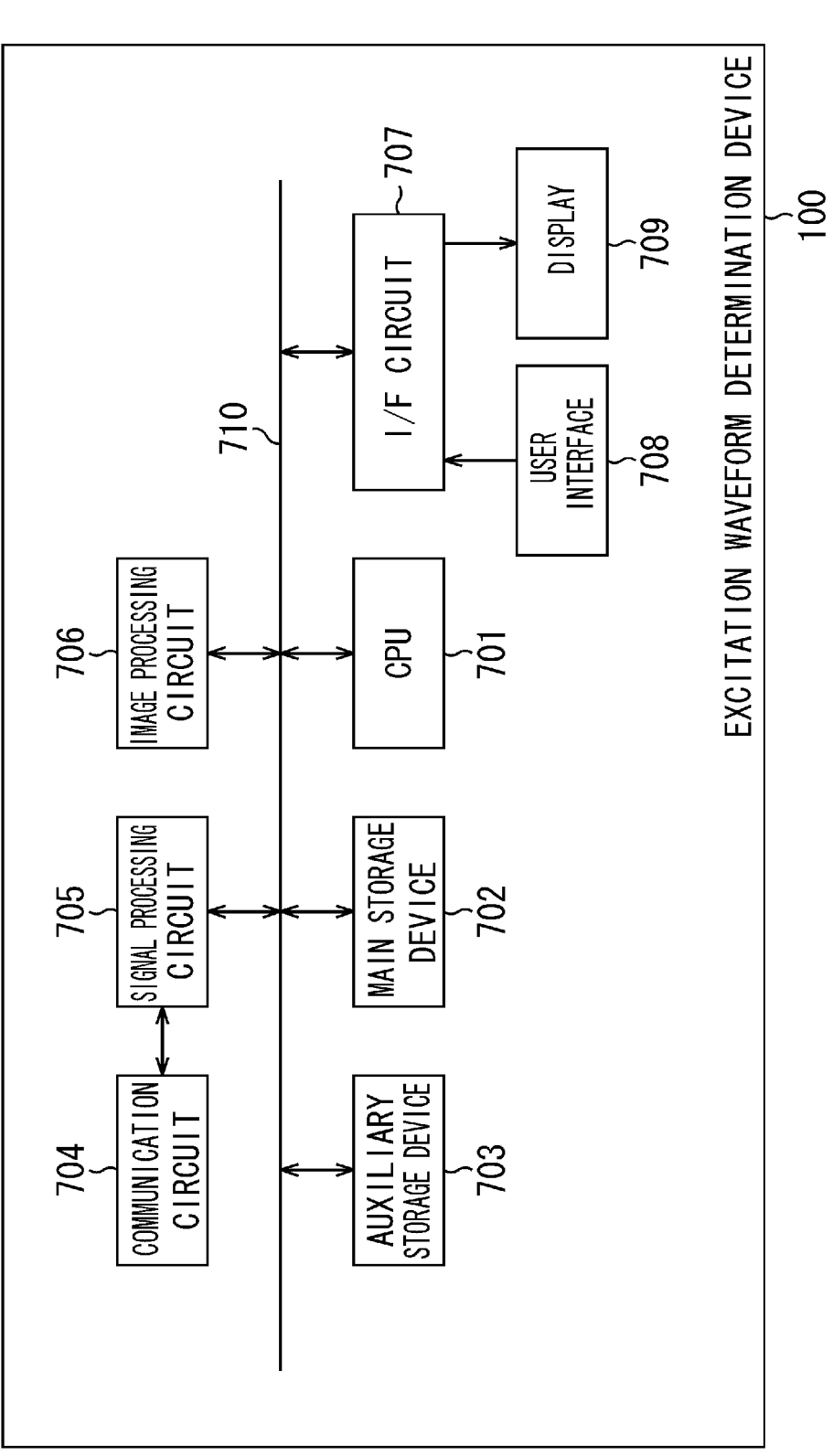

1

EXCITATION WAVEFORM DETERMINATION DEVICE, MOTOR DRIVE DEVICE, EXCITATION WAVEFORM DETERMINATION METHOD, MOTOR DRIVE METHOD, AND PROGRAM

TECHNICAL FIELD

The present invention relates to an excitation waveform determination device, a motor drive device, an excitation waveform determination method, a motor drive method, and a program, and is particularly suitable for being used for exciting a motor. This application is based upon and claims the benefit of priority of the prior Japanese Patent Application No. 2021-185783, filed on Nov. 15, 2021, the entire contents of which are incorporated herein by reference.

BACKGROUND ART

If a motor during driving vibrates, a noise may be generated. Further, if a motor being a power source vibrates in a hybrid vehicle or an electric vehicle, a ride comfort may be affected. Therefore, it is desired to suppress a vibration of a rotary electric machine. In order to suppress a vibration of a motor, it can be considered to change a structure of the motor. However, when a structure of an existing motor is changed, for example, major work such as replacement of a rotary electric machine is required. Accordingly, control of an excitation signal that is supplied to a stator coil of a motor for exciting the motor, is performed.

Non Patent Literature 1 describes that in order to suppress generation of a torque ripple, an excitation current obtained by superimposing a third harmonic current on a fundamental wave current, is used as an excitation current to be flowed through an open-winding structure PMSM (Permanent Magnet Synchronous Motor). Further, Patent Literature 1 describes that, when a base current of each phase of n-phase alternating current is expressed as B×cos θ+C×sin θ, an excitation current obtained by adding a high-order current expressed as e×cos(pθ)+f×sin(pθ) in which p is set to 6m±1 (m is a natural number) to the base current, is used as an excitation current to be flowed through a drive current of n-phase alternating current.

CITATION LIST

Patent Literature

Patent Literature 1: Japanese Laid-open Patent Publication No. 2007-312520

Non Patent Literature

Non Patent Literature 1: Co-authored by Kazunari Honda and Kan Akatsu, "Driving an Open-Winding Structure PMSM Using Third Harmonic Current Control", *IEEJ Transactions on Industry Applications*, Vol. 141, No. 1, pp. 35 to 45, Jan. 1, 2021

SUMMARY OF INVENTION

Technical Problem

However, in the technique described in Non Patent Literature 1, as an order of high frequency to be superimposed on the fundamental wave, an order capable of reducing the torque ripple of a synchronous motor is previously specified based on theoretical consideration, and only a harmonic component of the specified order is superimposed on the fundamental wave current. Further, in the technique described in Patent Literature 1, as an order of high frequency to be superimposed on the fundamental wave, an order capable of reducing an electromagnetic force in a radial direction of a synchronous motor is previously specified based on a result of phenomenological consideration, and only a harmonic component of the specified order is superimposed on the fundamental wave current. Therefore, the excitation currents capable of being obtained by the methods described in Non Patent Literature 1 and Patent Literature 1, are difficult to be said as excitation currents that are sufficient for suppressing vibrations of the motors, and thus there may be more optimum excitation currents. Actually, Non Patent Literature 1 describes that a sixth harmonic component of the torque ripple of the PMSM can be sufficiently suppressed, but it is not possible to sufficiently suppress a vibration of the PMSM.

The present invention has been made based on the problems as described above, and an object thereof is to determine a time waveform of an excitation signal capable of effectively suppressing a vibration of a motor.

Solution to Problem

An excitation waveform determination device of the present invention is an excitation waveform determination device for determining an excitation waveform being a time waveform of an excitation signal that is supplied to a stator coil of a motor, the excitation waveform determination device comprising: a candidate solution setting part configured to set a candidate solution group including one or more candidate solutions of the excitation waveform; an electromagnetic field analyzing part configured to calculate an electromagnetic force generated in a stator of the motor when the one or more candidate solution included in the candidate solution group is supplied to the motor, through execution of an electromagnetic field analysis; and an excitation waveform determining part configured to determine the excitation waveform based on a result of the execution of the electromagnetic field analysis by the electromagnetic field analyzing part, wherein the candidate solution setting part includes: an initial candidate solution setting part that sets an initial candidate solution group based on a fundamental wave condition that specifies a fundamental wave of the excitation waveform, and a harmonic superimposition condition that specifies a harmonic to be superimposed on the fundamental wave; and a candidate solution updating part that sets a new candidate solution group from the candidate solution group input therein; and wherein the excitation waveform determining part determines the excitation waveform from the initial candidate solution group or the new candidate solution group.

A motor drive device of the present invention is a motor drive device for driving a motor, comprising: an operating condition acquiring part configured to acquire an operating condition when operating the motor; an excitation waveform acquiring part configured to acquire, from pieces of information each specifying the excitation waveform determined for each of the fundamental wave conditions by the excitation waveform determination device according to any one of claims 1 to 9, information that specifies the excitation waveform corresponding to the operating condition when operating the motor acquired by the operating condition acquiring part; and an excitation signal generating part configured to generate an excitation signal for exciting the motor, based on the information that specifies the excitation waveform acquired by the excitation waveform acquiring part.

An excitation waveform determination method of the present invention is an excitation waveform determination method of determining an excitation waveform being a time waveform of an excitation signal that is supplied to a stator coil of a motor, the excitation waveform determination method comprising: a candidate solution setting step of setting a candidate solution group including one or more candidate solutions of the excitation waveform; an electromagnetic field analyzing step of calculating an electromagnetic force generated in a stator of the motor when the one or more candidate solution included in the candidate solution group is supplied to the motor, through execution of an electromagnetic field analysis; and an excitation waveform determining step of determining the excitation waveform based on a result of the execution of the electromagnetic field analysis by the electromagnetic field analyzing step, wherein the candidate solution setting step includes: an initial candidate solution setting step of setting an initial candidate solution group based on a fundamental wave condition that specifies a fundamental wave of the excitation waveform, and a harmonic superimposition condition that specifies a harmonic to be superimposed on the fundamental wave; and a candidate solution updating step of setting a new candidate solution group from the candidate solution group input therein; and wherein the excitation waveform determining step determines the excitation waveform from the initial candidate solution group or the new candidate solution group.

A motor drive method of the present invention is a motor drive method of driving a motor, the motor drive method including: an operating condition acquiring step of acquiring an operating condition when operating the motor; an excitation waveform acquiring step of acquiring, from pieces of information each specifying the excitation waveform determined for each of the fundamental wave conditions by the excitation waveform determination method, information that specifies the excitation waveform corresponding to the operating condition when operating the motor acquired by the operating condition acquiring step; and an excitation signal generating step of generating an excitation signal for exciting the motor, based on the information that specifies the excitation waveform acquired by the excitation waveform acquiring step.

A program of the present invention makes a computer function as each part of the excitation waveform determination device.

BRIEF DESCRIPTION OF DRAWINGS

FIG. 1 is a view illustrating one example of a functional configuration of an excitation waveform determination device.

FIG. 2 is a view illustrating one example of a functional configuration of a motor drive device.

FIG. 3 is a view illustrating one example of a configuration of a motor.

FIG. 4 is a view illustrating one example of a time waveform of an excitation current.

FIG. 6 is a flow chart explaining one example of a motor drive method.

FIG. 7 is a view illustrating one example of a configuration of hardware of the excitation waveform determination device.

DESCRIPTION OF EMBODIMENTS

Figure 5:
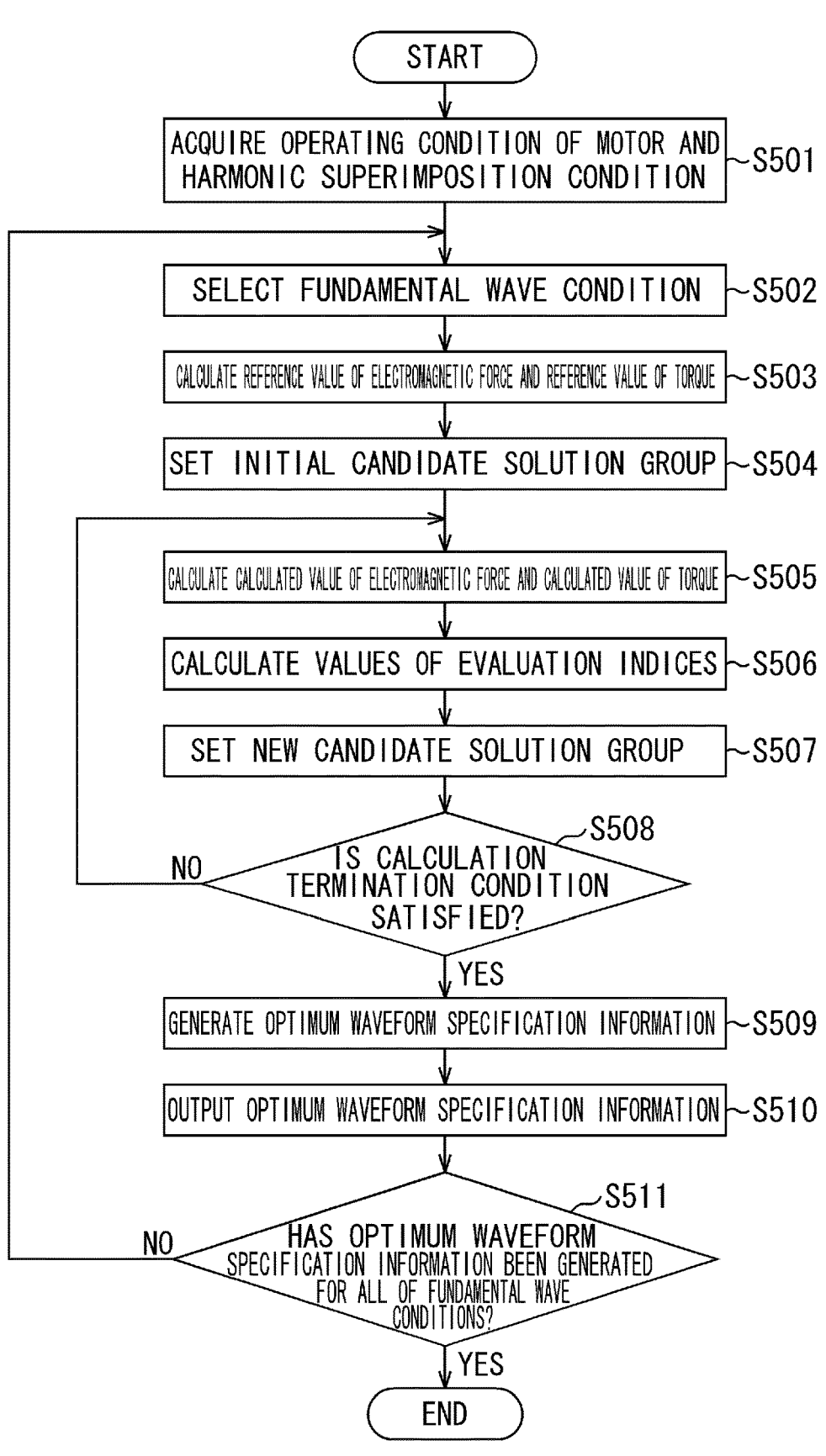
FIG. 5 is a flow chart explaining one example of an excitation waveform determination method.

Hereinafter, an embodiment of the present invention will be described while referring to the drawings.

Note that the description indicating that comparison targets such as lengths, positions, sizes, and intervals are the same, includes not only a case where they are strictly the same but also a case where they are differed within a range that does not depart from the gist of the invention (differed within a tolerance range defined when designing, for example).

A motor drive system of the present embodiment includes: an excitation waveform determination device 100; and a motor drive device 200. FIG. 1 is a view illustrating one example of a functional configuration of the excitation waveform determination device 100. FIG. 2 is a view illustrating one example of a functional configuration of the motor drive device 200. Hardware of the excitation waveform determination device 100 and the motor drive device 200 may be realized by using, for example, a processor (CPU, for example), storage devices (a main storage device and an auxiliary storage device, for example), an information processing device including various interface devices, or dedicated hardware. Note that the present embodiment exemplifies a case where the excitation waveform determination device 100 and the motor drive device 200 are realized by separate pieces of hardware. However, the excitation waveform determination device 100 and the motor drive device 200 may also be realized by a piece of hardware (one device).

[Excitation Waveform Determination Device 100]

First, one example of functions possessed by the excitation waveform determination device 100 will be explained. The excitation waveform determination device 100 determines an excitation waveform being a time waveform of an excitation signal that is supplied to a stator coil of a motor M for exciting the motor M. The present embodiment exemplifies a case where a time waveform of an excitation current is determined as the excitation waveform. However, it is also possible to determine a time waveform of an excitation voltage as the excitation waveform. The excitation waveform is only required to be able to specify a value at each time point of one cycle of electrical angle. For example, when an excitation waveform is set to express a value at each time point of one cycle of electrical angle, a value at each time point of each electrical angle cycle is derived from the value of the excitation waveform. Further, when, from a value at each time point of a half cycle of electrical angle, a value at each time point of the rest half cycle of electrical angle is derived, for example, an excitation waveform may be set to express a value at each time point of the half cycle of electrical angle.

<Motor M>

FIG. 3 is a view illustrating one example of a configuration of a motor M. In FIG. 3, arrow mark lines and a symbol illustrated in the vicinity of x, y, and z indicate directions of an x-coordinate, a y-coordinate, and a z-coordinate in an x-y-z orthogonal coordinate system. Note that a symbol of white circle (○) with black circle (●) given therein indicates a direction of the z-coordinate. A positive direction of z-axis is a direction from a far side toward a near side of the paper sheet. Further, in FIG. 3, arrow mark lines and a symbol illustrated in the vicinity of r, θ, and z indicate directions of an r-coordinate, a θ-coordinate, and a z-coordinate in a cylindrical coordinate system. Further, an origin of each of the coordinates is an axis of rotation 0 (center line) of the motor M, for example. However, in FIG. 3, the respective coordinates are indicated at positions separated from the axis of rotation 0 of the motor M, for the convenience of notation.

In FIG. 3, the motor M includes a rotor 310, and a stator 320.

The rotor 310 includes a rotor core 311, and permanent magnets 312a to 312d. The rotor core 311 is formed by laminating a plurality of electromagnetic steel sheets having the same planar shape, for example. Note that the rotor core 311 is not limited to one that uses the electromagnetic steel sheets being one example of soft magnetic material sheets. The rotor core 311 may also be, for example, a powder magnetic core, an amorphous core, and a nanocrystal core.

On the rotor core 311, through holes 311a to 311i that penetrate the rotor core 311 in a direction parallel to a rotary shaft of the motor M (z-axis direction) are formed.

A center position of the through hole 311a is the same as a position of the axis of rotation 0 of the motor M. In the through hole 311a, the rotary shaft (shaft) is disposed.

The through holes 311b to 311e are arranged with an interval therebetween in a circumferential direction (θ direction) of the motor M so as to surround the through hole 311a. Shapes and sizes of the thorough holes 311b to 311e are the same. In the through holes 311b to 311e, the permanent magnets 312a to 312d are disposed. In a state where the permanent magnets 312a to 312d are arranged in the through holes 311b to 311e, voids are formed on both sides of each of the permanent magnets 312a to 312d. The voids are partial regions of the through holes 311b to 311e.

The through holes 311f to 311i are arranged in regions on an outer peripheral side (r-axis positive direction side) of the motor M, relative to the through holes 311b to 311e. Shapes and sizes of the through holes 311f to 311i are the same. In the through holes 311f to 311i, not-illustrated rivets or the like for fixing the rotor core 311 are disposed, for example.

The plurality of electromagnetic steel sheets each having a circular shape formed with holes corresponding to the through holes 311a to 311i as described above, are laminated and fixed so as to align the positions of the holes, to thereby form the rotor core 311. Note that a through hole other than the through holes 311a to 311i may also be formed on the rotor core 311. Further, in place of at least one through hole out of the through holes 311b to 311e, another through hole in which at least one of a shape, a size, and a position thereof is different from that of the replaced through hole may also be formed on the rotor core 311. Further, the rotor core 311 may also be formed by performing so-called skew.

The stator 320 includes a stator core 321, and stator coils 322. The stator core 321 is formed by laminating a plurality of electromagnetic steel sheets having the same planar shape, for example. Note that the stator core 321 is not limited to one that uses the electromagnetic steel sheets being one example of soft magnetic material sheets. The stator core 321 may also be, for example, a powder magnetic core, an amorphous core, and a nanocrystal core. The stator core 321 includes a plurality of teeth portions 321a, and a yoke portion 321b (core back portion). Note that in FIG. 3, a reference numeral 321a is given to only one of the plurality of teeth portions, for the convenience of notation.

The plurality of teeth portions 321a are arranged to have an equal interval therebetween in the circumferential direction of the motor M. Shapes and sizes of the plurality of teeth portions 321a are the same. The yoke portion 321b has an approximately hollow cylindrical shape. The plurality of teeth portions 321a and the yoke portion 321b are arranged so that an end surface on an inner peripheral side of the yoke portion 321b and end surfaces on an outer peripheral side of the plurality of teeth portions 321a are fitted to each other. However, the plurality of teeth portions 321a and the yoke portion 321b are integrated (there is no boundary line therebetween).

Further, in a slot 321c, the stator coil 322 is arranged. The slot 321c is a region between two teeth portions 321a adjacent in a state of having an interval therebetween in the circumferential direction of the motor M. Note that in FIG. 3, a reference numeral 322 is given to only one stator coil, for the convenience of notation.

The plurality of electromagnetic steel sheets each having a circular shape and worked to form a shape corresponding to the plurality of teeth portions 321a and the yoke portion 321b (slots) as described above, are laminated and fixed so that the contours thereof (the inner edge of the yoke portion and the outer edges of the plurality of teeth portions) are fitted to each other, to thereby form the stator core 321. Note that the stator core 321 may also be formed by performing so-called skew.

Note that as is apparent from FIG. 3, the present embodiment exemplifies a case where the motor M is an inner rotor-type IPM (Interior Permanent Magnet) motor. However, the motor M is not limited to the inner rotor-type IPM motor. For example, the motor M may be a motor other than a synchronous motor, and it may also be an outer rotor-type motor. Further, the motor M is not limited to a radial gap-type motor, and it may also be an axial gap-type motor.

<Condition Acquiring Part 101>

A condition acquiring part 101 acquires various conditions required for calculation for determining an excitation waveform in the excitation waveform determination device 100. The condition acquiring part 101 acquires at least a fundamental wave condition BC and a harmonic superimposition condition HC. Further, the condition acquiring part 101 may also acquire an operating condition of the motor M.

The fundamental wave condition BC is information for specifying a fundamental wave (sine wave). The fundamental wave condition BC includes, for example, an amplitude of the fundamental wave, and a frequency of the fundamental wave (fundamental frequency). Further, the fundamental wave condition BC may also include a lead angle.

The operating condition of the motor M includes a velocity command value of the motor M and a torque command value of the motor M. The velocity command value of the motor M is a command value of a rotational speed of the motor M. The torque command value of the motor M is a command value of a torque of the motor M. The velocity command value of the motor M and the torque command value of the motor M acquired by the condition acquiring part 101 are values (assumed values) assumed as the rotational speed and the torque of the motor M. The rotational speed of the motor M corresponds to a fundamental frequency. The torque of the motor M corresponds to an amplitude and a lead angle of an excitation current. Accordingly, the condition acquiring part 101 may also acquire an amplitude and a frequency included in the fundamental wave condition BC by calculating them from the operating condition of the motor M. The present embodiment exemplifies a case where the condition acquiring part 101 acquires the fundamental wave condition BC by calculating it from the operating condition of the motor M.

Note that it is also possible to make the excitation waveform determination device 100 previously store a look-up table that stores the rotational speed, the torque, and the lead angle of the motor M, and the amplitude, the fundamental frequency, and the lead angle of the fundamental wave, by associating them with each other, for example. In such a case, the condition acquiring part 101 reads the amplitude, the fundamental frequency, and the lead angle of the fundamental wave from the look-up table, as information corresponding to the velocity command value of the motor M and the torque command value of the motor M. Note that when the lead angle is fixed, the lead angle may be or may not be stored in the look-up table.

The harmonic superimposition condition HC is information that specifies a harmonic to be superimposed on the fundamental wave. The present embodiment exemplifies a case where the harmonic superimposition condition HC includes a harmonic order n being information that specifies an order of harmonic to be superimposed on a fundamental wave included in an excitation waveform. Further, the present embodiment exemplifies a case where the condition acquiring part 101 acquires a positive integral value n of 2 or more, as the harmonic order n. Further, the present embodiment exemplifies a case where when the harmonic order n is acquired, harmonics of respective orders of 2 or more and n or less are superimposed on the fundamental wave. For example, when 3 is acquired as the harmonic order n (n=3), a second harmonic and a third harmonic are superimposed on the fundamental wave. However, the harmonic order n is not limited to one determined as described above. For example, the value of n may be set one by one. For example, it is possible to set that when 3 is acquired as the harmonic order n (n=3), only the third harmonic is superimposed on the fundamental wave. Further, it is also possible that when 3 and 5 (n=3, 5) are acquired, the third harmonic and a fifth harmonic are superimposed on the fundamental wave. As described above, in the present embodiment, it is possible to set an arbitrary order as the order of the harmonic (harmonic order n) to be superimposed on the fundamental wave.

Further, the harmonic superimposition condition HC may also include information that specifies an amplitude of each harmonic. However, in the present embodiment, an amplitude of each harmonic is set in a later-described candidate solution setting part 103. Therefore, it is set that the information that specifies the amplitude of each harmonic is not included in the harmonic superimposition condition HC.

Further, the harmonic superimposition condition HC may not necessarily include the harmonic order n, as long as it is the information that specifies the harmonic to be superimposed on the fundamental wave. For example, the harmonic superimposition condition HC may include, in place of or in addition to the harmonic order n, information capable of specifying the harmonic order n. The information capable of specifying the harmonic order n is, for example, an n-order harmonic frequency (a frequency of n times a fundamental wave frequency). The harmonic superimposition condition HC is preferably information capable of specifying the harmonic order n without performing a frequency analysis (Fourier transformation). This is because a calculation load can be reduced. For example, in a case where at least either of the harmonic order n and the n-order harmonic frequency is included in the harmonic superimposition condition HC, the harmonic superimposition condition HC includes information capable of specifying the harmonic order n without performing the frequency analysis. However, the harmonic superimposition condition HC may also be information capable of specifying the harmonic order n by performing the frequency analysis (Fourier transformation). For example, the harmonic superimposition condition HC may also include a modulation condition. The modulation condition is information used for modulating a fundamental wave. The modulation condition includes, for example, at least either of a rate of modulation and the number of pulses per one cycle of electrical angle.

Further, the fundamental wave condition BC and the harmonic superimposition condition HC are preferably pieces of information that specify a fundamental frequency and a harmonic frequency, respectively, without performing the frequency analysis (Fourier transformation). This is because a calculation load can be reduced. For example, when the fundamental wave condition BC includes the fundamental frequency, and the harmonic superimposition condition HC includes the harmonic order n, the fundamental wave condition BC and the harmonic superimposition condition HC include pieces of information that specify the fundamental frequency and the harmonic frequency, respectively, without performing the frequency analysis.

The condition acquiring part 101 acquires, other than the fundamental wave condition BC and the harmonic superimposition condition HC, information required for executing a later-described electromagnetic field analysis. The condition acquiring part 101 acquires, for example, a shape, a size, a physical property value, and so on of the motor M.

As a form of acquisition of the various conditions acquired by the condition acquiring part 101, there can be exemplified an input operation by an operator OP of a user interface of the excitation waveform determination device 100. However, the form of acquisition of the various conditions acquired by the condition acquiring part 101 is not limited to the input operation by the operator OP. For example, the condition acquiring part 101 may also acquire the various conditions through receiving from an external device, or reading from a portable storage medium.

<Reference Value Calculating Part 102>

A reference value calculating part 102 calculates, based on the fundamental wave condition BC acquired by the condition acquiring part 101, a reference value of electromagnetic force being an electromagnetic force generated in the stator 320 (stator core 321) of the motor M when exciting the motor M by an excitation current of the fundamental wave. Here, the reference value of electromagnetic force is described as $F_s$. Further, the reference value calculating part 102 calculates, based on the fundamental wave condition BC acquired by the condition acquiring part 101, a reference value of torque being a torque generated in the motor M when exciting the motor M by the excitation current of the fundamental wave. Here, the reference value of torque is described as $T_s$.

Here, the reason of calculating the reference value of electromagnetic force $F_s$ will be explained.

As will be described later, an electromagnetic field analyzing part 104 calculates a calculated value of electromagnetic force being an electromagnetic force generated in the stator 320 (stator core 321) of the motor M when exciting the motor M by an excitation current obtained by superimposing a harmonic on a fundamental wave. Here, the calculated value of electromagnetic force is described as $F_c$. A main cause of a noise generated in the motor M is a vibration of the stator 320 (stator core 321). The vibration of the stator 320 is directly evaluated by the electromagnetic force generated in the stator 320 of the motor M. Further, as the calculated value of electromagnetic force $F_c$ becomes smaller than the reference value of electromagnetic force $F_s$, the noise of the motor M is reduced more when compared to a case where the excitation current of fundamental wave is used. Accordingly, in the present embodiment, it is set that a difference (magnitude of difference) between the calculated value of electromagnetic force $F_c$ and the reference value of electromagnetic force $F_s$ is evaluated. Based on this, in the present embodiment, the reference value calculating part 102 calculates the reference value of electromagnetic force $F_s$ for evaluating the difference between the calculated value of electromagnetic force $F_c$ and the reference value of electromagnetic force $F_s$.

Next, the reason of calculating the reference value of torque $T_s$ will be explained.

As will be described later, the electromagnetic field analyzing part 104 calculates a calculated value of torque generated in the motor M when exciting the motor M by the excitation current obtained by superimposing the harmonic on the fundamental wave. Here, the calculated value of torque is described as $T_c$. As described above, as the calculated value of electromagnetic force $F_c$ becomes smaller than the reference value of electromagnetic force $F_s$, the noise of the motor M is reduced. However, the motor M may not be able to output an assumed torque because the harmonic is superimposed on the fundamental wave and thus an effective value of the excitation current becomes small. From such a viewpoint, it is preferable that a difference between the calculated value of torque $T_c$ and the reference value of torque $T_s$ is not deviated greatly. Based on this, in the present embodiment, the reference value calculating part 102 calculates the reference value of torque $T_s$ for evaluating the difference between the calculated value of torque $T_c$ and the reference value of torque $T_s$.

The reference value calculating part 102 calculates a magnetic flux density (vector) B at each part of the motor M when exciting the motor M by the excitation current of the fundamental wave specified as described above, through execution of an electromagnetic field analysis based on a numerical analysis. The present embodiment exemplifies a case where a nonlinear transient finite element method being one example of the numerical analysis is used for the electromagnetic field analysis. Further, the present embodiment exemplifies a case where the magnetic flux density B and an eddy current density (vector) Je in each element (mesh) set with respect to a calculation model of the motor M are calculated. Note that it is also possible to use a method of numerical analysis other than the finite element method (a discretization method) such as a difference method, for the electromagnetic field analysis.

As a method of the electromagnetic field analysis using the finite element method, there is a method using an A-o method. In this case, primitive equations for performing the electromagnetic field analysis are given by the following equation (1) to equation (4), based on the Maxwell equations (Maxwell). Note that in each equation, → indicates a vector.

[Mathematical equation 1]

$$\mathrm{rot}\left(\frac{1}{\mu}\mathrm{rot}\vec{A}\right) = \vec{J}_0 - \sigma\frac{\partial \vec{A}}{\partial t} - \sigma \mathrm{grad}\phi \qquad (1)$$

$$\mathrm{div}\left(\sigma\left(\frac{\partial \vec{A}}{\partial t} + \mathrm{grad}\phi\right)\right) = 0 \qquad (2)$$

$$\vec{J}e = -\sigma\left(\frac{\partial \vec{A}}{\partial t} + \mathrm{grad}\phi\right) \qquad (3)$$

$$\vec{B} = \mathrm{rot}\vec{A} \qquad (4)$$

In the equation (1) to the equation (4), $\mu$ is a magnetic permeability, A is a vector potential, $\sigma$ is a conductivity, $J_0$ is an excitation current density, Je is an eddy current density, and B is a magnetic flux density. By simultaneously solving the equation (1) and the equation (2), the vector potential A and a scalar potential $\varphi$ are determined. After that, from the equation (3) and the equation (4), the magnetic flux density B and the eddy current density Je are determined with respect to each element. Note that the equation (1) expresses an equation of a case where an x-component $\mu_x$, a y-component $\mu_y$, and a z-component $\mu_z$ of the magnetic permeability are equal ($\mu_x=\mu_y=\mu_z$), for the sake of simplifying the description.

In the present embodiment, the reference value calculating part 102 calculates an electromagnetic force F generated in the stator core 321, based on the magnetic flux density B in each element set with respect to the stator core 321. Further, the reference value calculating part 102 calculates a torque T generated in the motor M, based on the magnetic flux density B in each element set with respect to an air gap between the rotor core 311 and the stator core 321. The electromagnetic force F and the torque T can be calculated by using, for example, a publicly-known nodal force method. In the nodal force method, a Maxwell stress tensor is calculated based on the magnetic flux density B, and the Maxwell stress tensor is used to calculate the electromagnetic force (vector) F including electromagnetic forces $F_r$, $F_\theta$, and $F_z$ in the r-direction, the $\theta$-direction, and the z-direction, as components. Further, the electromagnetic force $F_\theta$ in the $\theta$-direction is used to calculate the torque (vector) T. Note that the method of calculating the electromagnetic force F and the torque T is not limited to the nodal force method, and any other publicly-known method may be employed.

Note that the case of executing a three-dimensional analysis is exemplified here, but it does not always have to execute the three-dimensional analysis. For example, a two-dimensional analysis with respect to a cross section obtained by cutting the motor M perpendicular to the axis of rotation 0 (z-axis direction), may also be executed.

Further, the method itself of performing the electromagnetic field analysis is a general method. Therefore, a detailed explanation of the electromagnetic field analysis will be omitted.

Further, the reference value of torque $T_s$ corresponds to the amplitude of the fundamental wave, so that it can also be calculated from the fundamental wave. Therefore, it does not always have to use the result of the electromagnetic field analysis to calculate the reference value of torque $T_s$.

<Candidate Solution Setting Part 103>

The candidate solution setting part 103 sets one or a plurality of candidate solutions of the excitation waveform, based on the fundamental wave condition and the harmonic superimposition condition (harmonic order n) acquired by the condition acquiring part 101. Here, the fundamental wave condition is described as BC. Further, the harmonic superimposition condition is described as HC.

In the present embodiment, the candidate solution setting part 103 includes an initial candidate solution setting part 103a, and a candidate solution updating part 103b.

The initial candidate solution setting part 103a generates an initial candidate solution group formed of one or a plurality of candidate solutions, based on the fundamental wave condition BC and the harmonic superimposition condition HC (harmonic order n) acquired by the condition acquiring part 101. The candidate solution updating part 103b sets a new candidate solution group from the candidate solution group input therein. For example, excitation wave-forms in which harmonics of orders of n and less than n are superimposed on the fundamental wave, are set as candidate solutions. Here, the initial candidate solution group is described as IS. Further, the new candidate solution group is described as US.

Further, in the present embodiment, the initial candidate solution setting part 103a and the candidate solution updating part 103b set the plurality of candidate solutions (the initial candidate solution group IS and the new candidate solution group US) in accordance with a real-valued genetic algorithm being one example of a metaheuristic method. However, an optimization calculation based on a meta-heuristic method other than the genetic algorithm may also be executed. As the metaheuristic method other than the genetic algorithm, there are, for example, hill climbing, tabu search, Simulated Annealing, and Ant Colony Optimization.

The number of the candidate solutions included in the candidate solution groups (the initial candidate solution group IS and the new candidate solution group US) may be the number determined by the algorithm of the optimization calculation, or it may also be determined by designation of the number, a calculation time, and the like by a user. When the number of the order of the harmonic specified by the harmonic order n included in the harmonic superimposition condition HC is one, the initial candidate solution setting part 103a and the candidate solution updating part 103b set a time waveform obtained by superimposing a time wave-form of the fundamental wave on a time waveform of the harmonic of the order, as one of the candidate solutions. When the number of the order of the harmonic specified by the harmonic order n included in the harmonic superimposition condition HC is two or more, the initial candidate solution setting part 103a and the candidate solution updating part 103b set a time waveform obtained by superimposing a time waveform of the fundamental wave on a time waveform as a result of adding time waveforms of the two or more numbers of harmonics, as one of the candidate solutions. One candidate solution includes information that specifies a value (current value) at each time point of one cycle of electrical angle.

The initial candidate solution setting part 103a sets the order specified by the harmonic order n, as the order of harmonic. Further, the initial candidate solution setting part 103a sets a parameter except for the order of harmonic in a random manner, for example. The initial candidate solution setting part 103a calculates an initial candidate solution based on the order of harmonic and the parameter except for the order of harmonic. The initial candidate solution setting part 103a calculates a plurality of initial candidate solutions by differentiating the order of harmonic and contents of the parameter except for the order of harmonic. The initial candidate solution setting part 103a sets the plurality of initial candidate solutions as the initial candidate solution group IS. Further, the candidate solution updating part 103b sets candidate solutions in repetition processing of the second time and thereafter of the genetic algorithm, as new candidate solutions. At this time, the candidate solution updating part 103b selects, from the plurality of candidate solutions included in the current candidate solution group input in the candidate solution updating part 103b, a prede-termined number of candidate solutions in ascending order of a value of an evaluation function J in an equation (5) calculated by an evaluating part 105a to be described later, as new candidate solutions US, for example. At this time, the candidate solution updating part 103b selects only candidate solutions that satisfy a constraint equation of an equation (6)

calculated by the evaluating part 105a to be described later. Specifically, the candidate solution updating part 103b arranges the candidate solutions that satisfy the constraint equation of the equation (6) in ascending order of the value of the evaluation function J in the equation (5), and selects only the predetermined number of the arranged candidate solutions in ascending order of the value of the evaluation function J.

Subsequently, the candidate solution updating part 103b executes crossing-over or mutation. The candidate solution updating part 103b sets the selected predetermined number of candidate solutions and the candidate solutions generated through the crossing-over or the mutation, as a new candi-date solution group US (a candidate solution group of next generation). The new candidate solution group US generated through the crossing-over or the mutation is also generated based on the fundamental wave condition BC and the harmonic superimposition condition HC (harmonic order n) acquired by the condition acquiring part 101. As described above, one candidate solution includes a value (current value) at each time point of one cycle of electrical angle.

The present embodiment exemplifies a case where the candidate solution as described above is the candidate solution of the time waveform of the excitation current. FIG. 4 is a view illustrating one example of a time waveform of an excitation current 401. As illustrated in FIG. 4, the time waveform (excitation waveform) of the excitation current 401 becomes a time waveform in which the harmonic is superimposed on the fundamental wave.

<Electromagnetic Field Analyzing Part 104>

The electromagnetic field analyzing part 104 derives the magnetic flux density B and the eddy current density Je in the motor M when exciting the motor M by each candidate solution of the excitation waveform (excitation current) included in the candidate solution groups (the initial candi-date solution group IS and the new candidate solution group US) set by the candidate solution setting part 103, by executing the electromagnetic field analysis based on the Maxwell equations. Further, the electromagnetic field ana-lyzing part 104 calculates, based on the magnetic flux density B in each element set with respect to the stator core 321, the electromagnetic force F generated in the stator 320 (stator core 321) as the calculated value of electromagnetic force $F_c$. Further, the electromagnetic field analyzing part 104 calculates, based on the magnetic flux density B in each element set with respect to the air gap between the rotor core 311 and the stator core 321, the torque T generated in the motor M as the calculated value of torque $T_c$. One example of the calculation method of the magnetic flux density B, the eddy current density Je, the electromagnetic force, and the torque is as explained in the item of <Reference value calculating part 102>, and thus a detailed explanation of the calculation method will be omitted here.

Note that the present embodiment exemplifies a case where each of the reference value of electromagnetic force $F_s$ and the calculated value of electromagnetic force $F_c$ is expressed by a vector of the electromagnetic force (a vector determined by a component in a circumferential direction and a component in a radial direction). However, it is not necessarily designed as above. For example, each of the reference value of electromagnetic force $F_s$ and the calcu-lated value of electromagnetic force $F_c$ may also be expressed by using only the component in the radial direc-tion.

<Excitation Waveform Determining Part 105>

An excitation waveform determining part 105 determines an excitation waveform from the initial candidate solution group IS or the new candidate solution group US set by the candidate solution setting part 103, based on the result of the execution of the electromagnetic field analysis by the electromagnetic field analyzing part 104. Specifically, when the excitation waveform determining part 105 can determine (select) the excitation waveform from the initial candidate solution group IS, the candidate solution setting part 103 does not set the new candidate solution group US. On the other hand, when the excitation waveform determining part 105 cannot determine the excitation waveform from the initial candidate solution group IS, the candidate solution setting part 103 sequentially generates new candidate solution groups US by updating the initial candidate solution group IS. The excitation waveform determining part 105 determines (selects) the excitation waveform from the new candidate solution groups US sequentially generated by the candidate solution setting part 103. In the present embodiment, the excitation waveform determining part 105 includes an evaluating part 105*a*, and a determining part 105*b*.

<<Evaluating Part 105*a*>>

The evaluating part 105*a* calculates a value of an evaluation index including an electromagnetic force evaluation index for evaluating a value of the electromagnetic force generated in the stator 320 (stator core 321), based on the result of the execution of the electromagnetic field analysis by the electromagnetic field analyzing part 104. Further, in the present embodiment, the evaluating part 105*a* further calculates, as an evaluation index, a value of a torque evaluation index for evaluating a value of the torque generated in the stator 320 (stator core 321), based on the result of the execution of the electromagnetic field analysis by the electromagnetic field analyzing part 104.

As described above, in the present embodiment, as the calculated value of electromagnetic force $F_c$ calculated by the electromagnetic field analyzing part 104 becomes smaller than the reference value of electromagnetic force $F_s$ calculated by the reference value calculating part 102, the noise of the motor M is reduced, and thus a case is exemplified in which the index of evaluating the difference between the calculated value of electromagnetic force $F_c$ and the reference value of electromagnetic force $F_s$ is set to the electromagnetic force evaluation index. Further, in the present embodiment, it is preferable that the calculated value of torque $T_c$ calculated by the electromagnetic field analyzing part 104 is not deviated greatly from the reference value of torque $T_s$ calculated by the reference value calculating part 102, and thus a case is exemplified in which the index of evaluating the difference between the calculated value of torque $T_c$ and the reference value of torque $T_s$ is set to the torque evaluation index.

Here, the electromagnetic force is calculated as the vector, and thus the magnitude of the calculated value of electromagnetic force $F_c$ is described as $|F_c|$. In like manner, the magnitude of the reference value of electromagnetic force $F_s$ is described as $|F_s|$. Further, the torque is also calculated as the vector, and thus the magnitude of the calculated value of torque $T_c$ is described as $|T_c|$. In like manner, the magnitude of the reference value of torque $T_s$ is described as $|T_s|$. The present embodiment exemplifies a case where the difference between the calculated value of electromagnetic force $F_c$ and the reference value of electromagnetic force $F_s$ is evaluated by the value of the evaluation function J in the following equation (5). Further, a case is exemplified in which the difference between the calculated value of torque $T_c$ and the reference value of torque $T_s$ is evaluated by the constraint equation of the following equation (6).

[Mathematical equation 2]

$$\min. \ J = |F_c| - |F_s| \tag{5}$$

$$||T_s| - |T_c|| < \varepsilon \tag{6}$$

In the equation (5), min. is a symbol that indicates performance of calculation of a minimum value of J. Further, in the equation (6), $\varepsilon$ is a previously-set positive value. When the value of $\varepsilon$ is excessively large, a candidate solution having a large difference between the calculated value of torque $T_c$ and the reference value of torque $T_s$ becomes likely to be selected. On the other hand, when the value of $\varepsilon$ is excessively small, it may not be able to find a solution (so-called no solution may occur). From such a viewpoint, $\varepsilon$ is previously set.

In the present embodiment, each of a value on the right side of the equation (5) and a value on the left side of the equation (6) is one example of the value of the evaluation index. Further, the right side of the equation (5) is one example of the electromagnetic force evaluation index, and the left side of the equation (6) is one example of the torque evaluation index.

When the values of the evaluation indices are calculated by the evaluating part 105*a* in a manner as above, the candidate solution updating part 103*b* arranges the candidate solutions that satisfy the constraint equation of the equation (6) in ascending order of the value of the evaluation function J in the equation (5), and selects only the predetermined number of the arranged candidate solutions in ascending order of the value of the evaluation function J, as described above. Subsequently, the candidate solution updating part 103*b* executes crossing-over or mutation. The candidate solution updating part 103*b* sets the selected predetermined number of candidate solutions and the candidate solutions generated through the crossing-over or the mutation, as a new candidate solution group US (a candidate solution group of next generation).

The processing in the candidate solution updating part 103*b*, the electromagnetic field analyzing part 104, and the evaluating part 105*a* is repeatedly executed until when a predetermined calculation termination condition is satisfied. The candidate solution updating part 103*b* outputs a candidate solution when satisfying the predetermined calculation termination condition, to the determining part 105*b*. Here, the candidate solution when satisfying the predetermined calculation termination condition is described as ES. The present embodiment exemplifies a case where the optimum calculation based on the real-valued genetic algorithm is executed. Therefore, as the calculation termination condition, there is used a condition generally adopted in the method of genetic algorithm such that, for example, an alternation of generations has been performed a predetermined number of times, or the difference between the candidate solution of the last time and that of this time has satisfied a predetermined condition (the candidate solution has not been changed between the last time and this time, for example).

Note that the genetic algorithm itself can be realized by a publicly-known technique, and thus a detailed explanation thereof will be omitted here.

<<Determining Part 105*b*>>

The determining part 105*b* determines an excitation waveform based on the value of the evaluation index calculated by the evaluating part 105*a*.

The determining part 105b sets, out of the candidate solutions ES when satisfying the predetermined calculation termination condition, a candidate solution having the minimum value of the evaluation function J in the equation (5), as an optimum solution, and calculates (determines) an excitation waveform specified from the candidate solution, as an optimum solution of the excitation waveform. The optimum solution of the excitation waveform includes information that specifies a value (current value) at each time point of one cycle of electrical angle. In the explanation below, the information that specifies a value (current value) at each time point of one cycle of electrical angle is also referred to as optimum waveform specification information.

<Processing for Each Fundamental Wave Condition BC (Operating Condition of Motor M)>

The processing by the reference value calculating part 102, the candidate solution setting part 103, the electromagnetic field analyzing part 104, and the excitation waveform determining part 105 is executed for each of one or a plurality of fundamental wave conditions BC acquired by the condition acquiring part 101. As described above, the fundamental wave condition BC includes the amplitude and the frequency (fundamental frequency) of the fundamental wave. Further, the fundamental wave condition BC may also include the lead angle. The rotational speed of the motor M corresponds to the fundamental frequency. The torque of the motor M corresponds to the amplitude and the lead angle of the excitation current. Therefore, the execution of the processing by the reference value calculating part 102, the candidate solution setting part 103, the electromagnetic field analyzing part 104, and the excitation waveform determining part 105 for each of one or a plurality of fundamental wave conditions BC, corresponds to the execution of the processing for each of one or a plurality of operating conditions (rotation frequency, torque, and so on) of the motor M. Note that when the number of the fundamental wave condition BC (the operating condition of the motor M) acquired by the condition acquiring part 101 is one, the processing by the reference value calculating part 102, the candidate solution setting part 103, the electromagnetic field analyzing part 104, and the excitation waveform determining part 105 may be executed with respect to only the fundamental wave condition BC (operating condition).

<Output Part 106>

The output part 106 outputs the optimum solution of the excitation waveform (optimum waveform specification information) determined by the determining part 105b. As an output form of the optimum waveform specification information, transmission to the motor drive device 200 is exemplified. The communication between the excitation waveform determination device 100 and the motor drive device 200 may be wire communication or wireless communication. Further, the output form of the optimum waveform specification information is not limited to the transmission to the motor drive device 200. For example, the output part 106 may store the optimum waveform specification information in an internal or external storage medium of the excitation waveform determination device 100, or it may display the information on a computer display.

[Motor Drive Device 200]

Next, one example of functions possessed by the motor drive device 200 will be described. The motor drive device 200 drives the motor M based on the excitation waveform determined by the excitation waveform determination device 100.

<Excitation Waveform Storing Part 201>

The excitation waveform storing part 201 stores the optimum waveform specification information determined by the excitation waveform determination device 100, for each operating condition of the motor M. As described above, the operating condition of the motor M includes the velocity command value of the motor M and the torque command value of the motor M. Note that the excitation waveform storing part 201 may also be provided outside the motor drive device 200. Further, the excitation waveform determination device 100 determines the optimum waveform specification information for each of one or a plurality of fundamental wave conditions BC. As described above, the determination of the optimum waveform specification information for each of one or a plurality of fundamental wave conditions BC is equivalent to the determination of the optimum waveform specification information for each of one or a plurality of operating conditions of the motor M. Therefore, the storage of the optimum waveform specification information determined by the excitation waveform determination device 100 for each operating condition of the motor M is equivalent to the storage of the optimum waveform specification information determined by the excitation waveform determination device 100 for each fundamental wave condition BC.

<Operating Condition Acquiring Part 202>

An operating condition acquiring part 202 acquires, as an operating condition when operating the motor M, a new operating condition different from the current operating condition. It is assumed that when starting the operation of the motor M, the current operating condition does not exist. Therefore, when starting the operation of the motor M, the operating condition acquiring part 202 acquires an operating condition when starting the operation of the motor M as a new operating condition. As described above, the operating condition of the motor M includes the velocity command value of the motor M and the torque command value of the motor M. The operating condition acquiring part 202 acquires the operating condition when operating the motor M from a control device 210, for example. Here, the operating condition when operating the motor M is described as OC. The control device 210 may generate the torque command value in accordance with a difference between an actual measured value and a target value of the torque of the motor M, or it may also generate the velocity command value in accordance with a difference between an actual measured value and a target value of the rotational speed of the motor M, for example. Note that the operating condition acquiring part 202 does not always have to acquire the operating condition OC when operating the motor M from the control device 210. For example, the operating condition OC when operating the motor M may also be previously set (scheduled). In such a case, the operating condition acquiring part 202 may also acquire the set operating condition based on, for example, an input operation by an operator of a user interface of the motor drive device 200.

<Excitation Waveform Acquiring Part 203>

An excitation waveform acquiring part 203 acquires the optimum waveform specification information corresponding to the operating condition OC when operating the motor M acquired by the operating condition acquiring part 202, from the pieces of optimum waveform specification information for each of the operating conditions of the motor M stored in the excitation waveform storing part 201.

<Excitation Signal Generating Part 204>

An excitation signal generating part 204 generates an excitation current for exciting the motor M, based on the optimum waveform specification information acquired by the excitation waveform acquiring part 203. For example, when the motor drive device 200 executes PWM (Pulse Width Modulation) control, the excitation signal generating part 204 executes the following processing, for example. First, the excitation signal generating part 204 generates a modulated wave based on the optimum waveform specification information. Subsequently, the excitation signal generating part 204 compares the generated modulated wave with a predetermined carrier wave (triangular wave, for example) to generate a pulse signal, and supplies the pulse signal to the stator coil 322 of the motor M. Note that the method of generating the excitation current is not limited to the method based on the PWM control, and it may be another publicly-known method (for example, a method based on PAM (Pulse Amplitude Modulation) control). Further, the excitation signal generating part 204 may directly supply the excitation current specified by the optimum waveform specification information to the motor M. Further, the excitation signal generating part 204 may convert the excitation current specified by the optimum waveform specification information into an excitation voltage by using an impedance of the motor M, and then supply the excitation voltage to the motor M.

[Flow Chart]

Next, one example of an excitation waveform determination method of the present embodiment using the excitation waveform determination device 100, will be explained while referring to a flow chart in FIG. 5. The flow chart in FIG. 5 may be realized by processing including execution of a program stored in a storage device of the excitation waveform determination device 100 by a processor of the excitation waveform determination device 100, for example.

First, in step S501, the condition acquiring part 101 acquires various conditions required for the calculation for determining the excitation waveform in the excitation waveform determination device 100. The conditions include the fundamental wave condition BC, and the harmonic superimposition condition HC. The present embodiment exemplifies a case where the condition acquiring part 101 calculates the fundamental wave condition BC based on the operating condition of the motor M, to thereby acquire the fundamental wave condition BC. The operating condition of the motor M includes the velocity command value of the motor M, and the torque command value of the motor M.

Next, in step S502, the condition acquiring part 101 selects, from the fundamental wave conditions BC (operating conditions of the motor M) acquired in step S501, one fundamental wave condition BC that is not selected in this step S502.

Next, in step S503, the reference value calculating part 102 calculates the reference value of electromagnetic force $F_s$ being the electromagnetic force generated in the stator 320 (stator core 321) of the motor M when exciting the motor M by the excitation current of the fundamental wave specified from the fundamental wave condition BC selected in step S502, and the reference value of torque $T_s$ being the torque generated in the motor M when exciting the motor M by the excitation current of the fundamental wave, through execution of the electromagnetic field analysis with respect to the motor M.

Next, in step S504, the initial candidate solution setting part 103a sets the initial candidate solution group IS being the initial value of the candidate solution group formed of a plurality of candidate solutions of the excitation waveform.

Next, in step S505, the electromagnetic field analyzing part 104 calculates the calculated value of electromagnetic force $F_c$ being the electromagnetic force generated in the stator 320 (stator core 321) of the motor M when exciting the motor M by the excitation waveform (excitation current) specified by the candidate solution set in step S504, and the calculated value of torque $T_c$ being the torque generated in the motor M when exciting the motor M by the excitation waveform (excitation current), through execution of the electromagnetic field analysis with respect to the motor M. The electromagnetic field analyzing part 104 executes the above-described calculation of the calculated value of electromagnetic force $F_c$ and the calculated value of torque $T_c$ for each candidate solution included in the initial candidate solution group IS.

Next, in step S506, the evaluating part 105a calculates the value of the evaluation index that evaluates the difference between the calculated value of electromagnetic force $F_c$ and the reference value of electromagnetic force $F_s$, and the value of the evaluation index that evaluates the difference between the calculated value of torque $T_c$ and the reference value of torque $T_s$. Concretely, the evaluating part 105a calculates the value of the evaluation function $J$ $(=|F_c|-|F_s|)$ in the equation (5), and the value of the left side $(=\|T_s|-|T_c\|)$ in the equation (6).

Next, in step S507, the candidate solution updating part 103b updates the candidate solution group to set the new candidate solution group US. Concretely, the candidate solution setting part 103 arranges the candidate solutions that satisfy the constraint equation of the equation (6) in ascending order of the value of the evaluation function $J$ in the equation (5), and selects only a predetermined number of the arranged candidate solutions in ascending order of the value of the evaluation function $J$. Subsequently, the candidate solution updating part 103b executes the crossing-over or the mutation. The candidate solution updating part 103b sets the selected predetermined number of candidate solutions, and the candidate solutions generated through the crossing-over or the mutation, as the new candidate solution group US (the candidate solution group of next generation).

Next, in step S508, the determining part 105b judges whether or not the calculation termination condition is satisfied. When, as a result of this judgment, the calculation termination condition is not satisfied (NO in step S508), the processing in step S505 is executed again. In this case, in step S505, not the initial candidate solution group IS set in step S504 but the new candidate solution group US updated in step S507 is used.

When, as a result of the judgment in step S508, the calculation termination condition is satisfied (YES in step S508), processing in step S509 is executed. In step S509, the determining part 105b sets, out of the candidate solutions ES when satisfying the calculation termination condition, a candidate solution having the minimum value of the evaluation function $J$ in the equation (5), as an optimum solution, and calculates (determines) an excitation waveform specified from the candidate solution, as an optimum solution of the excitation waveform. Further, the determining part 105b generates information that specifies a value (current value) at each time point of one cycle of electrical angle included in the optimum solution of the excitation waveform, as the optimum waveform specification information.

Next, in step S510, the output part 106 outputs the optimum waveform specification information generated in step S509 to the motor drive device 200.

Next, in step S511, the excitation waveform determination device 100 judges whether or not the optimum waveform specification information has been generated with respect to all of the fundamental wave conditions BC (operating conditions of the motor M) acquired in step S501. When, as a result of this judgment, the optimum waveform specification information has not been generated with respect to all of the fundamental wave conditions BC (operating conditions of the motor M) acquired in step S501 (NO in step S511), the processing in step S502 is executed again. Further, when the optimum waveform specification information has been generated with respect to all of the fundamental wave conditions BC (operating conditions of the motor M) acquired in step S501 (YES in step S511), the processing according to the flow chart in FIG. 5 is terminated.

Next, one example of a motor drive method of the present embodiment using the motor drive device 200, will be explained while referring to a flow chart in FIG. 6. Note that here, it is assumed that the pieces of optimum waveform specification information regarding the fundamental wave conditions BC corresponding to all of operating conditions capable of being assumed as the operating conditions of the motor M are stored in the excitation waveform storing part 201 before starting the flow chart in FIG. 6. The flow chart in FIG. 6 may be realized by processing including execution of a program stored in a storage device of the motor drive device 200 by a processor of the motor drive device 200, for example.

First, in step S601, the operating condition acquiring part 202 judges whether or not an operating condition different from the current operating condition has been acquired as the operating condition OC when operating the motor M. When, as a result of this judgment, the operating condition OC when operating the motor M has not been acquired (NO in step S601), the operating condition acquiring part 202 waits until the operating condition OC when operating the motor M is acquired. Further, when the operating condition OC when operating the motor M has been acquired (YES in step S601), processing in step S602 is executed.

In step S602, the motor drive device 200 judges whether or not the operation of the motor M is to be terminated, based on the operating condition OC when operating the motor M. When, as a result of this judgment, the operation of the motor M is not to be terminated (NO in step S602), processing in step S603 is executed. In step S603, the excitation waveform acquiring part 203 acquires the optimum waveform specification information corresponding to the operating condition OC when operating the motor M acquired by the operating condition acquiring part 202, from the pieces of optimum waveform specification information for the respective fundamental wave conditions BC (operating conditions of the motor M) stored in the excitation waveform storing part 201.

Next, in step S604, the excitation signal generating part 204 generates an excitation current for exciting the motor M, based on the optimum waveform specification information acquired in step S603, and supplies the excitation current to the motor M.

When, as a result of the judgment in step S602 described above, the operation of the motor M is to be terminated (YES in step S602), processing in step S605 is executed. In step S605, the excitation signal generating part 204 stops the supply of the excitation current to the motor M. When the processing in step S605 is terminated, the processing according to the flow chart in FIG. 6 is terminated.
<Hardware of Excitation Waveform Determination Device 100>

Next, one example of hardware of the excitation waveform determination device 100 will be explained. In FIG. 7, the excitation waveform determination device 100 includes a CPU 701, a main storage device 702, an auxiliary storage device 703, a communication circuit 704, a signal processing circuit 705, an image processing circuit 706, an I/F circuit 707, a user interface 708, a display 709, and a bus 710.

The CPU 701 totally controls the entire excitation waveform determination device 100. The CPU 701 uses the main storage device 702 as a work area to execute a program stored in the auxiliary storage device 703. The main storage device 702 stores data temporarily. The auxiliary storage device 703 stores various kinds of data, in addition to the program executed by the CPU 701.

The communication circuit 704 is a circuit for performing communication with the outside of the excitation waveform determination device 100. The communication circuit 704 may perform wireless communication or wire communication with the outside of the excitation waveform determination device 100.

The signal processing circuit 705 performs various kinds of signal processing on a signal received by the communication circuit 704 or a signal input in accordance with the control by the CPU 701.

The image processing circuit 706 performs various kinds image processing on a signal input in accordance with the control by the CPU 701. The signal after being subjected to this image processing is output to the display 709, for example.

The user interface 708 is a part with which the operator OP issues instructions to the excitation waveform determination device 100. The user interface 708 includes, for example, a button, a switch, a dial, and the like. Further, the user interface 708 may include a graphical user interface that uses the display 709.

The display 709 displays an image based on the signal output from the image processing circuit 706. The I/F circuit 707 exchanges data with a device connected to the I/F circuit 707. In FIG. 7, the user interface 708 and the display 709 are indicated as the devices connected to the I/F circuit 707. However, the device connected to the I/F circuit 707 is not limited to these. For example, a portable storage medium may be connected to the I/F circuit 707. Further, at least a part of the user interface 708 and the display 709 may also be provided outside the excitation waveform determination device 100.

Note that the CPU 701, the main storage device 702, the auxiliary storage device 703, the signal processing circuit 705, the image processing circuit 706, and the I/F circuit 707 are connected to the bus 710. The communication among these components is performed via the bus 710. Further, the hardware of the motor drive device 200 may be realized by, for example, one in the section of <Hardware of excitation waveform determination device 100>, and in FIG. 7 in which the excitation waveform determination device 100 is replaced with the motor drive device 200. Therefore, a detailed explanation of the hardware of the motor drive device 200 will be omitted. Further, the hardware of the excitation waveform determination device 100 and the motor drive device 200 is not limited to the hardware illustrated in FIG. 7, as long as it is possible to realize the functions of the excitation waveform determination device 100 and the motor drive device 200 described above. For example, instead of or in addition to the CPU 701, a GPU may also be used as the processor.

Calculation Example

Next, a calculation example will be explained. In this calculation example, a numerical analysis was executed by using an inner rotor-type IPM motor as a motor of calculation target. A typical specification of the IPM motor is as follows.

Outside diameter of stator: 140 mm
Outside diameter of rotor: 88.4 mm
Height (laminating thickness of core): 24 mm
Number of slots of stator: 48
Number of poles: 8

Table 1 indicates results of this calculation example. Note that in Table 1, values of the electromagnetic force and the torque are values that are made dimensionless as relative values in which the maximum values of the electromagnetic force and the torque are respectively set to one.

electromagnetic force generated in the IPM motor when exciting the IPM motor by the sin current.

From Table 1, it can be understood that the electromagnetic force in the opt (invention example) is reduced more than that in the sin (comparative example), in each of the condition 1 to the condition 4. Further, it can be understood that under the operating condition like the condition 1 in which the rotation frequency and the torque are small and thus the vibration of the IPM motor does not become large, the effect of reducing the electromagnetic force does not become large. Further, when the conditions 1 and 2 are compared, it can be understood that the larger the torque, the larger the effect of reducing the electromagnetic force. Further, when the conditions 1, 3, and 4 are compared, it can be understood that the higher the rotation frequency, the larger the effect of reducing the electromagnetic force. From the above, it can be understood that in this calculation example, as the torque and the rotation frequency become large, the effect of reducing the electromagnetic force can be expected to be enhanced.

TABLE 1

| CONDITION | ROTATION NUMBER (rpm) (—) | | | ELECTROMAGNETIC FORCE (—) | REDUCTION RATIO (%) | TORQUE (—) |
|---|---|---|---|---|---|---|
| 1 | 3000 | opt | (INVENTION EXAMPLE) | 0.2920 | −0.1 | 0.141 |
| | 3000 | sin | (COMPARATIVE EXAMPLE) | 0.2923 | — | 0.141 |
| 2 | 3000 | opt | (INVENTION EXAMPLE) | 0.7678 | −23.2 | 1.000 |
| | 3000 | sin | (COMPARATIVE EXAMPLE) | 1.0000 | — | 1.000 |
| 3 | 10000 | opt | (INVENTION EXAMPLE) | 0.2975 | −0.6 | 0.151 |
| | 10000 | sin | (COMPARATIVE EXAMPLE) | 0.2993 | — | 0.151 |
| 4 | 14000 | opt | (INVENTION EXAMPLE) | 0.2697 | −9.9 | 0.153 |
| | 14000 | sin | (COMPARATIVE EXAMPLE) | 0.2993 | — | 0.151 |

In Table 1, the opt (invention example) indicates that the IPM motor was excited by the optimum solution of the excitation waveform (excitation current) calculated by the method of the present embodiment. The sin (comparative example) indicates that the IPM motor was excited by the fundamental wave (excitation current) used when calculating the optimum solution of the excitation waveform. In the explanation of this calculation example, the optimum solution of the excitation waveform (excitation current) calculated by the method of the present embodiment is also referred to as an opt current. Further, the fundamental wave (excitation current) used when calculating the optimum solution of the excitation waveform is also referred to as a sin current.

The rotation frequency is a rotation frequency of the IPM motor (rotor). The electromagnetic force is an electromagnetic force generated in the stator core. The torque is a torque generated in the IPM motor. The reduction ratio is a reduction ratio of the electromagnetic force generated in the IPM motor when exciting the IPM motor by the opt current to the electromagnetic force generated in the IPM motor when exciting the IPM motor by the sin current. Concretely, the reduction ratio is calculated by executing calculation of (sin−opt)÷sin×100. In this calculation equation, opt is the electromagnetic force generated in the IPM motor when exciting the IPM motor by the opt current. Sin is the Accordingly, the output part 106 (FIG. 1) may also output the excitation waveform based on the rotation frequency and the torque. Concretely, when a predetermined output condition is satisfied, the output part 106 may output the candidate solution ES when satisfying the calculation termination condition. The predetermined output condition is, for example, a condition determined among the following three conditions. The first condition is a rotation frequency condition indicating that the rotation frequency of the motor M is a predetermined rotation frequency or more. The second condition is a torque condition indicating that the torque of the motor M is a predetermined torque or more. The third condition is a condition indicating that the rotation frequency condition and the torque condition are both satisfied (a condition indicating that the rotation frequency of the motor M is the predetermined rotation frequency or more and the torque of the motor M is the predetermined torque or more). Further, when the predetermined output condition is not satisfied, the output part 106 may not output the candidate solution, and it may output information indicating that the output condition is not satisfied, for example. If it is designed as above, for example, the motor drive device 200 (FIG. 2) can use the excitation waveform determined by the excitation waveform determination device 100 within a range in accordance with at least either of the rotation frequency condition and the torque condition. Therefore, it is also possible that the motor drive device 200 uses the excitation waveform determined by the excitation waveform determination device 100 only when the vibration suppression effect of the motor M is high, when driving the motor M. For example, when the excitation signal generating part 204 generates the excitation waveform by using an inverter such as a PWM inverter, the excitation waveform to be generated may become complicated. In this case, switching of the inverter is increased, which may increase a loss. Therefore, when the vibration suppression effect of the motor M is small or does not exist almost at all, the motor drive device 200 can drive the motor M based on a normal excitation waveform. Note that the excitation waveform determination device 100 may check whether or not the torque condition is satisfied based on the reference value of torque $T_s$ output from the reference value calculating part 102, for example. In such a case, the excitation waveform determination device 100 can exclude a candidate solution that does not satisfy the torque condition from the candidate of optimum solution, for example. Therefore, it is possible to reduce the load of the excitation waveform determination device 100. Further, the excitation waveform acquiring part 203 may also determine whether or not the information of the excitation waveform storing part 201 is used, based on the operating condition acquired from the operating condition acquiring part 202 and at least either of the torque condition and the rotation frequency condition. Further, when the information of the excitation waveform storing part 201 is not used, the excitation waveform acquiring part 203 may calculate an excitation waveform through publicly-known normal processing, and it may also acquire an excitation waveform generated by another functional part (not illustrated) that performs publicly-known normal processing.

Summary

As described above, in the present embodiment, the excitation waveform determination device 100 sets the initial candidate solution group IS and the new candidate solution group US as one or a plurality of candidate groups of the excitation waveform, based on the harmonic superimposition condition HC being the information that specifies the harmonic to be superimposed on the fundamental wave included in the excitation waveform. The excitation waveform determination device 100 calculates respective electromagnetic forces generated in the stator 320 (stator core 321) when making the candidate solutions included in the one or plurality of set candidate solution groups of the excitation waveform flow through the motor M, by executing the electromagnetic field analysis. The excitation waveform determination device 100 determines the excitation waveform based on the result of the execution of the electromagnetic field analysis. Therefore, it is possible to determine the time waveform of the excitation signal capable of effectively suppressing the vibration of the motor M.

Further, in the present embodiment, the excitation waveform determination device 100 calculates the value of the evaluation index including the electromagnetic force evaluation index for evaluating the value of the electromagnetic force generated in the stator 320 (stator core 321), based on the result of the execution of the electromagnetic field analysis, and determines the excitation waveform based on the calculated value of the evaluation index. Accordingly, it is possible to determine the excitation waveform based on the objective index value. Therefore, it is possible to determine the time waveform of the excitation signal capable of more securely suppressing the vibration of the motor M.

Further, in the present embodiment, the excitation waveform determination device 100 determines the excitation waveform by using the value of the evaluation index that evaluates the difference between the calculated value of electromagnetic force $F_c$ and the reference value of electromagnetic force $F_s$, as the value of the electromagnetic force evaluation index for evaluating the value of the electromagnetic force generated in the stator 320 (stator core 321). Therefore, it is possible to determine the excitation waveform based on the result of evaluating how much the electromagnetic force generated in the stator 320 (stator core 321) of the motor M can be reduced when compared to the case of exciting the motor M by the fundamental wave.

Further, in the present embodiment, the excitation waveform determination device 100 calculates the reference value of electromagnetic force $F_s$ by executing the electromagnetic field analysis. Therefore, it is possible to use an accurate electromagnetic force as the electromagnetic force generated in the stator 320 (stator core 321) of the motor M when exciting the motor M by the fundamental wave.

Further, in the present embodiment, the excitation waveform determination device 100 calculates the electromagnetic force generated in the stator 320 (stator core 321) and the torque generate in the motor M, respectively, when the candidate solution is supplied to the stator coil 322 of the motor M, by executing the electromagnetic field analysis. Accordingly, it is possible to determine the excitation waveform by considering not only the electromagnetic force generated in the stator 320 (stator core 321) but also the torque generated in the motor M. Therefore, it is possible to determine the time waveform of the excitation signal capable of more effectively suppressing the vibration of the motor M.

Further, in the present embodiment, the excitation waveform determination device 100 determines the excitation waveform by using the value of the evaluation index that evaluates the difference between the calculated value of torque $T_c$ and the reference value of torque $T_s$, as the value of the torque evaluation index for evaluating the value of the torque generated in the motor M. Therefore, it is possible to determine the excitation waveform whose effective value is not greatly deviated from the fundamental wave.

Further, in the present embodiment, the excitation waveform determination device 100 calculates the reference value of torque $T_s$ by executing the electromagnetic field analysis. Therefore, it is possible to use an accurate torque as the torque generated in the motor M when exciting the motor M by the fundamental wave.

Further, in the present embodiment, the excitation waveform determination device 100 acquires the harmonic superimposition condition HC including the harmonic order n (n is an integer of 2 or more) being the information that specifies the order of harmonic to be superimposed on the fundamental wave included in the excitation waveform, and sets the candidate solutions as a result of superimposing the harmonics of orders of n and less than n on the fundamental wave. Accordingly, it is possible to set the candidates of the excitation waveform without limiting the order of harmonic to a specific order. Therefore, it is possible to determine the time waveform of the excitation signal capable of more effectively suppressing the vibration of the motor M.

Further, in the present embodiment, the excitation waveform determination device 100 sets the new candidate solution by using the metaheuristic method. Therefore, it is possible to determine the time waveform of the excitation signal capable of effectively suppressing the vibration of the motor M without performing logical consideration or phenomenological consideration.

Further, in the present embodiment, the excitation waveform determination device 100 determines the excitation waveform for each fundamental wave condition BC. Therefore, even in a case where the operating condition of the motor M corresponding to the fundamental wave condition BC changes, it is possible to determine the time waveform of the excitation signal capable of effectively suppressing the vibration of the motor M in each operating condition.

Further, in the present embodiment, the motor drive device 200 acquires the optimum waveform specification information corresponding to the operating condition OC when operating the motor M, from the pieces of optimum waveform specification information each specifying the excitation waveform determined for each of the fundamental wave conditions BC by the excitation waveform determination device 100. The motor drive device 200 generates the excitation signal for exciting the motor M, based on the acquired optimum waveform specification information. Therefore, it is possible to effectively suppress the vibration of the motor M, regardless of the operating condition OC when operating the motor M.

Modified Example

The present embodiment exemplifies the case where the difference between the calculated value of electromagnetic force $F_c$ and the reference value of electromagnetic force $F_s$ is evaluated by the value of the evaluation function J in the equation (5). Further, the present embodiment exemplified the case where the difference between the calculated value of torque $T_c$ and the reference value of torque $T_s$ is evaluated by using the constraint equation of the equation (6). However, it is not necessarily designed as above. For example, the difference between the calculated value of electromagnetic force $F_c$ and the reference value of electromagnetic force $F_s$, and the difference between the calculated value of torque $T_c$ and the reference value of torque $T_s$ may also be evaluated by using the following equation (7).

[Mathematical equation 3]

$$\text{min. } J = w_1(|F_c| - |F_s|) + w_2(||T_s| - |T_c||) \tag{7}$$

In the equation (7), each of $w_1$ and $w_2$ is a weighting coefficient having a positive value. The weighting coefficients $w_1$, $w_2$ are previously-set coefficients for balancing the evaluation of the difference between the calculated value of electromagnetic force $F_c$ and the reference value of electromagnetic force $F_s$, and the evaluation of the difference between the calculated value of torque $T_c$ and the reference value of torque $T_s$. For example, when the difference between the calculated value of electromagnetic force $F_c$ and the reference value of electromagnetic force $F_s$ is more important than the difference between the calculated value of torque $T_c$ and the reference value of torque $T_s$, the value of the weighting coefficient $w_1$ is made to be larger than the value of the weighting coefficient $w_2$. When the evaluation function J in the equation (7) is used, the constraint equation of the equation (6) is unnecessary.

Further, the case was exemplified in which, in the equation (5) and the equation (7), the optimization problem is the minimization problem of determining the minimum value of the evaluation function J. However, it is not necessarily designed as above. For example, the evaluation function J may also be an evaluation function obtained by multiplying the entire right side of the equation (5) and the equation (7) by (−1). In such a case, the optimization problem becomes the maximization problem of determining the maximum value of the evaluation function J.

Further, the present embodiment exemplified the case where the excitation waveform determination device 100 (candidate solution setting part 103) sets the plurality of candidate solutions as the candidate solutions. However, the number of candidate solution set by the excitation waveform determination device 100 (candidate solution setting part 103) may also be one. In such a case, when the electromagnetic force and the torque generated in the stator 320 (stator core 321) when supplying an excitation waveform of a candidate solution to the motor M are less than threshold values, the excitation waveform determination device 100 may determine the candidate solution as the excitation waveform to be supplied to the motor M, for example.

Note that the excitation waveform determination device, the motor drive device, the excitation waveform determination method, the motor drive method, and the like explained in the embodiments of the present invention can be realized when a computer executes a program. Further, a computer-readable recording medium recording the program and a computer program product such as the program can also be adopted as embodiments of the present invention. Note that the computer-readable recording medium indicates a non-transitory recording medium. The non-transitory recording medium is, for example, a recording medium capable of continuously recording data even if there is no external supply of power to the recording medium. As the non-transitory recording medium, it is possible to use, for example, a flexible disk, a hard disk, an optical disk, a magneto-optical disk, a CD-ROM, a magnetic tape, a non-volatile memory card, a ROM, or the like. Further, the embodiments of the present invention may also be realized by PLC (Programmable Logic Controller), or dedicated hardware such as ASIC (Application Specific Integrated Circuit).

It should be noted that the above explained embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

INDUSTRIAL APPLICABILITY

The present invention can be utilized for driving a motor, for example.

The invention claimed is:

1. An excitation waveform determination device for determining an excitation waveform being a time waveform of an excitation signal that is supplied to a stator coil of a motor, the excitation waveform determination device comprising:
   a computer processor including processing circuitry that:
   sets a candidate solution group including one or more candidate solutions of the excitation waveform;
   calculates an electromagnetic force generated in a stator of the motor when the one or more candidate solution included in the candidate solution group is supplied to the motor, through execution of an electromagnetic field analysis; and

27

28 determines the excitation waveform based on a result of the execution of the electromagnetic field analysis, the computer processor sets an initial candidate solution group of initial one based on a fundamental wave condition that specifies a fundamental wave of the excitation waveform, and a harmonic superimposition condition that specifies a harmonic to be superimposed on the fundamental wave and sets a new candidate solution group from the candidate solution group input therein; wherein the computer processor determines the excitation waveform from the initial candidate solution group or the new candidate solution group, the excitation waveform capable of suppressing a vibration of the motor; and wherein the computer processor drives the motor based on the excitation waveform that has been determined.

2. The excitation waveform determination device according to claim 1, wherein the computer processor calculates a value of an evaluation index including an electromagnetic force evaluation index for evaluating a value of the electromagnetic force generated in the stator by the candidate solution, based on the result of the execution of the electromagnetic field analysis and determines the excitation waveform based on the value of the evaluation index.

3. The excitation waveform determination device according to claim 2, wherein the electromagnetic force evaluation index is an index that evaluates a difference between a calculated value of electromagnetic force generated in the stator by the candidate solution calculated by the electromagnetic field analyzing part and a reference value of electromagnetic force generated in the stator when an excitation signal of the fundamental wave is supplied to the stator coil of the motor.

4. The excitation waveform determination device according to claim 3, wherein the computer processor calculates the reference value of electromagnetic force by executing the electromagnetic field analysis.

5. The excitation waveform determination device according to claim 4, wherein the computer processor executes the electromagnetic field analysis to further calculate a torque generated in the motor when the candidate solution of the excitation waveform included in the candidate solution group is supplied to the stator coil of the motor.

6. The excitation waveform determination device according to claim 5, wherein the computer processor calculates a value of an evaluation index including a torque evaluation index for evaluating a value of the torque generated in the motor by the candidate solution, based on the result of the execution of the electromagnetic field analysis and determines the excitation waveform based on the value of the evaluation index, wherein the torque evaluation index is an index that evaluates a difference between a calculated value of torque generated in the motor by the candidate solution and a reference value of torque being a torque corresponding to an amplitude of the excitation signal of the fundamental wave.

7. The excitation waveform determination device according to claim 3, wherein the computer processor executes the electromagnetic field analysis to further calculate a torque generated in the motor when the candidate solution of the excitation waveform included in the candidate solution group is supplied to the stator coil of the motor.

8. The excitation waveform determination device according to claim 7, wherein the computer processor calculates a value of an evaluation index including a torque evaluation index for evaluating a value of the torque generated in the motor by the candidate solution, based on the result of the execution of the electromagnetic field analysis and determines the excitation waveform based on the value of the evaluation index, wherein the torque evaluation index is an index that evaluates a difference between a calculated value of torque generated in the motor by the candidate solution and a reference value of torque being a torque corresponding to an amplitude of the excitation signal of the fundamental wave.

9. The excitation waveform determination device according to claim 2, wherein the computer processor executes the electromagnetic field analysis to further calculate a torque generated in the motor when the candidate solution of the excitation waveform included in the candidate solution group is supplied to the stator coil of the motor.

10. The excitation waveform determination device according to claim 9, wherein the computer processor calculates a value of an evaluation index including a torque evaluation index for evaluating a value of the torque generated in the motor by the candidate solution, based on the result of the execution of the electromagnetic field analysis and determines the excitation waveform based on the value of the evaluation index, wherein the torque evaluation index is an index that evaluates a difference between a calculated value of torque generated in the motor by the candidate solution and a reference value of torque being a torque corresponding to an amplitude of the excitation signal of the fundamental wave.

11. The excitation waveform determination device according to claim 1, wherein the computer processor executes the electromagnetic field analysis to further calculate a torque generated in the motor when the candidate solution of the excitation waveform included in the candidate solution group is supplied to the stator coil of the motor.

12. The excitation waveform determination device according to claim 11, wherein the computer processor calculates a value of an evaluation index including a torque evaluation index for evaluating a value of the torque generated in the motor by the candidate solution, based on the result of the execution of the electromagnetic field analysis and determines the excitation waveform based on the value of the evaluation index, wherein the torque evaluation index is an index that evaluates a difference between a calculated value of torque generated in the motor by the candidate solution and a reference value of torque being a torque corresponding to an amplitude of the excitation signal of the fundamental wave.

13. The excitation waveform determination device according to claim 1, wherein the harmonic superimposition condition includes a harmonic order that specifies an order of the harmonic, and wherein when the harmonic order is set to n (n is an integer of 2 or more), the initial candidate solution group includes the candidate solutions as a result of superimposing harmonics of orders of n and less than n on the fundamental wave.

14. The excitation waveform determination device according to claim 1, wherein
the computer processor sets the new candidate solution by using a metaheuristic method.

15. The excitation waveform determination device according to claim 1, wherein:
the computer processor calculates respective electromagnetic forces generated in the stator when the candidate solutions included in the candidate solution group are supplied to the stator coil of the motor, through the execution of the electromagnetic field analysis, for each of the fundamental wave conditions and determines the excitation waveform based on the result of the execution of the electromagnetic field analysis, for each of the fundamental wave conditions.

16. An excitation waveform determination method of determining an excitation waveform being a time waveform of an excitation signal that is supplied to a stator coil of a motor, the excitation waveform determination method comprising: a candidate solution setting step of setting a candidate solution group including one or more candidate solutions of the excitation waveform; an electromagnetic field analyzing step of calculating an electromagnetic force generated in a stator of the motor when the one or more candidate solution included in the candidate solution group is supplied to the motor, through execution of an electromagnetic field analysis; and an excitation waveform determining step of determining the excitation waveform based on a result of the execution of the electromagnetic field analysis by the electromagnetic field analyzing step, wherein the candidate solution setting step includes: an initial candidate solution setting step of setting an initial candidate solution group of initial one based on a fundamental wave condition specifies a fundamental wave of the excitation waveform, and a harmonic superimposition condition specifies a harmonic to be superimposed on the fundamental wave; and a candidate solution updating step of setting a new candidate solution group from the candidate solution group input therein wherein the excitation waveform determining step determines the excitation waveform from the initial candidate solution group or the new candidate solution group, the excitation waveform capable of suppressing a vibration of the motor; and a driving step of driving the motor based on the excitation waveform that has been determined.

17. A non-transitory computer-readable storage medium recording a program, executable by a computer processor including processing circuitry, for causing a computer to execute determination of an excitation waveform being a time waveform of an excitation signal that is supplied to a stator coil of a motor, the program causing a computer to execute: a candidate solution setting step of setting a candidate solution group including one or more candidate solutions of the excitation waveform; an electromagnetic field analyzing step of calculating an electromagnetic force generated in a stator of the motor when the one or more candidate solution included in the candidate solution group is supplied to the motor, through execution of an electromagnetic field analysis; and an excitation waveform determining step of determining the excitation waveform based on a result of the execution of the electromagnetic field analysis by the electromagnetic field analyzing step, wherein the candidate solution setting step includes: an initial candidate solution setting step of setting an initial candidate solution group based on a fundamental wave condition specifies a fundamental wave of the excitation waveform, and a harmonic superimposition condition specifies a harmonic to be superimposed on the fundamental wave; and a candidate solution updating step of setting a new candidate solution group from the candidate solution group input therein; wherein the excitation waveform determining step determines the excitation waveform from the initial candidate solution group or the new candidate solution group, the excitation waveform capable of suppressing a vibration of the motor; and a driving step of driving the motor based on the excitation waveform that has been determined.

* * * * *